(12) United States Patent
Enzinna et al.

(10) Patent No.: US 6,917,502 B2
(45) Date of Patent: Jul. 12, 2005

(54) POWER SUPPLY CIRCUIT AND METHOD FOR A MOTOR VEHICLE ELECTRICAL ACCESSORY LOAD

(75) Inventors: Donald John Enzinna, Lockport, NY (US); Stephan Michael Vetter, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 425 days.

(21) Appl. No.: 10/109,017

(22) Filed: Mar. 28, 2002

(65) Prior Publication Data

US 2003/0184935 A1 Oct. 2, 2003

(51) Int. Cl.[7] .............................................. H02H 3/00
(52) U.S. Cl. ........................................ 361/72; 315/82
(58) Field of Search ...................... 361/82, 90, 72, 361/92; 315/82; 320/140, 142, 13, 135

(56) References Cited

U.S. PATENT DOCUMENTS

| | | | |
|---|---|---|---|
| 4,493,001 A | 1/1985 | Sheldrake | .................... 361/92 |
| 4,902,956 A | * 2/1990 | Sloan | .......................... 320/135 |
| 5,381,295 A | * 1/1995 | Rund et al. | .................... 361/92 |
| 5,438,237 A | * 8/1995 | Mullins et al. | ................ 315/82 |
| 5,615,076 A | * 3/1997 | Slepian et al. | ................. 361/90 |
| 6,150,734 A | 11/2000 | Neibecker et al. | ......... 307/10.1 |
| 6,606,227 B2 | 8/2003 | Rapinski et al. | ............... 361/86 |
| 6,624,531 B2 | 9/2003 | Disser et al. | ............... 307/10.1 |

\* cited by examiner

Primary Examiner—Gregory J. Toatley, Jr.
Assistant Examiner—Boris Benenson
(74) Attorney, Agent, or Firm—Patrick M. Griffin

(57) ABSTRACT

An improved circuit supplies electrical power to a vehicle accessory load, such as a load that is powered through a vehicle accessory load connector or cigarette lighter plug. The circuit utilizes battery voltage comparator and timer switching circuitry to interrupt the supply of power to the accessory load if the engine-driven alternator fails to charge the storage battery for at least a predefined time interval (i.e., when the vehicle engine is not running), and to automatically re-establish electrical power supply to the load when battery charging resumes (i.e., when engine operation resumes).

6 Claims, 1 Drawing Sheet

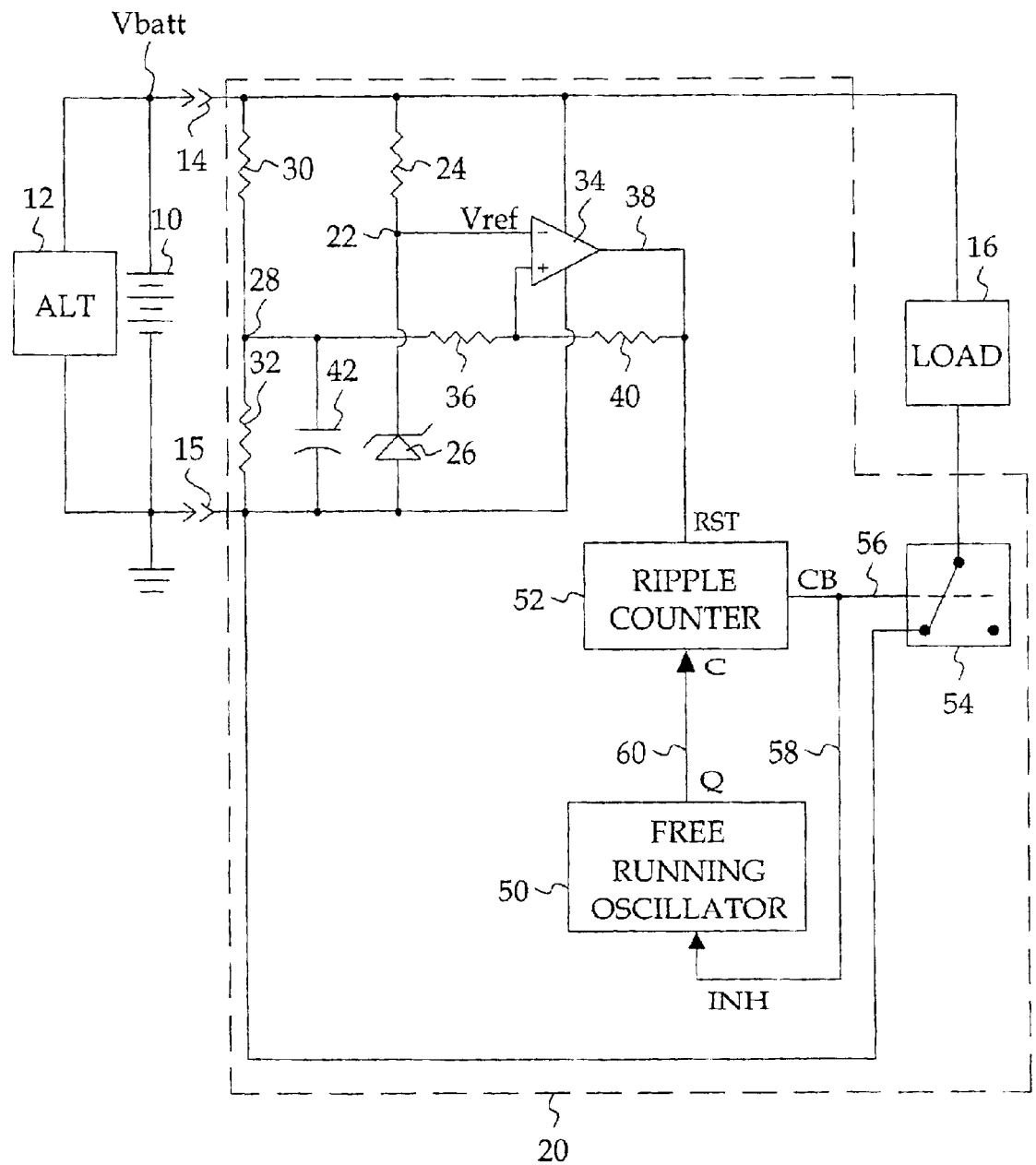

POWER SUPPLY CIRCUIT AND METHOD FOR A MOTOR VEHICLE ELECTRICAL ACCESSORY LOAD

TECHNICAL FIELD

This invention relates to motor vehicle electrical accessory loads, and more particularly to a circuit and method for supplying electrical power to an accessory load during operation of the vehicle engine.

BACKGROUND OF THE INVENTION

Various electric accessory loads can be operated in a vehicle, using the vehicle electrical system to supply the electrical power requirements of the load. Such loads may be in the form of permanently installed devices, as in the case of factory-installed equipment, or portable devices, as in the case of consumer equipment that is powered through a vehicle accessory load connector or cigarette lighter plug. Although an engine-driven alternator develops current for both charging the storage battery and supplying power to electrical loads during vehicle operation, many electrical loads consume sufficient power to discharge the vehicle storage battery if left on during a prolonged period of vehicle inactivity. Accordingly, the electrical systems in some vehicles have been designed to automatically disconnect the accessory power supply after the engine has been turned off for a predefined interval and/or if the ignition switch is off and the battery voltage falls below a reference value. See, for example, the U.S. Pat. No. 4,493,001, which is assigned to General Motors Corporation, and the earlier issued patents mentioned therein. However, many vehicle electrical systems do not have such a safeguard against battery discharging, and what is needed is an accessory load power supply circuit that will protect against battery discharging in otherwise unprotected vehicles.

SUMMARY OF THE INVENTION

The present invention is directed to an improved circuit and method for supplying electrical power to a vehicle accessory load, such as a load that is powered through a vehicle accessory load connector or cigarette lighter plug. The circuit of this invention utilizes battery voltage comparator and timer switching circuitry to interrupt the supply of power to the accessory load if the engine-driven alternator fails to charge the storage battery for at least a predefined time interval (i.e., when the vehicle engine is not running), and to automatically re-establish electrical power supply to the load when battery charging resumes (i.e., when engine operation resumes).

BRIEF DESCRIPTION OF THE DRAWINGS

The single drawing FIGURE is a diagram of an accessory load electric power supply circuit according to this invention.

DESCRIPTION OF THE PREFERRED EMBODIMENT

Referring to the drawing, the present invention is described in the context of a conventional motor vehicle electrical system including a 12-volt storage battery 10, an engine-driven alternator and charging circuit (ALT) 12, and an accessory load connector or cigarette lighter plug as signified by the connectors 14, 15. Also, a conventional accessory load, such as a portable resistance heater, is designated by the reference numeral 16, and the power supply circuit of this invention is designated by the reference numeral 20. In general, the circuit 20 compares the terminal voltage (Vbatt) of battery 10 to a reference voltage (Vref), establishes (or re-establishes) a power connection to the load 16 when Vbatt is above Vref, and interrupts the power connection if Vbatt falls below the Vref for at least a predefined interval such as 30 seconds. The implementation suggested in the drawing is on in which the circuit 20 is coupled to the accessory load connectors 14, 15, and the load 16 is separate from the circuit 20. However, the circuit 20 may be integrated into the load 16, if desired. Other implementations are also possible; for example, the circuit 20 may be interposed between the battery 10 and the accessory load connectors 14, 15.

The reference voltage Vref of circuit 20, which may be 2.5 volts for example, is established at the junction 22 between resistor 24 and zener diode 26, and a scaled down version of Vbatt is established at the junction 28 between resistors 30 and 32. In particular, the resistors 30 and 32 are selected so that the voltage at junction 28 is equal to Vref when Vbatt is equal to a specified switching voltage (such as 13 volts, for example) in excess of the maximum nominal open-circuit terminal voltage of battery 10 but lower than a minimum voltage produced by the alternator 12 during engine operation. The voltage at junction 28 is coupled to the non-inverting input of operational amplifier 34 via resistor 36, and Vref is coupled to the inverting input of amplifier 34. The amplifier 34 is referenced to Vbatt as shown, so that its output voltage on line 38 switches from ground voltage to Vbatt when Vbatt rises above the specified switching voltage (13 volts). A further resistor 40 provides a feedback voltage to the non-inverting input of amplifier 34 so that Vbatt must fall somewhat below the specified switching voltage before the amplifier output voltage on line 38 switches from Vbatt to ground. This hysteresis, along with the filter function of capacitor 42, prevents erratic switching of amplifier 34 when the voltage at junction 28 is subject to electrical noise. Thus, the output of amplifier 34 on line 38 can be considered as a digital "Power OK" indication having a high (near Vbatt) voltage when Vbatt is above the specified switching voltage (i.e., when the vehicle engine is running and the battery 10 is being charged), and a low (near ground) voltage when Vbatt is below the specified voltage (i.e., when the vehicle engine is off, or the engine is running but the alternator 12 is inoperative).

A timer circuit comprising an interconnected free running oscillator 50 and ripple counter 52 controls the operation of a power switch 54 coupled between ground voltage and one terminal of electrical load 16. In general, the switch 54 is activated to the depicted state coupling load 16 to battery ground when the carry bit (CB) output of ripple counter 52 on line 56 has a low logic level voltage, and otherwise assumes the opposite state isolating load 16 from battery ground. Although depicted in a mechanical implementation, it is obvious that the switch 54 may be implemented electronically with a transistor or the like. The CB output of counter 52 is fed back to an inhibit (INH) input of oscillator 50 via line 58 so that oscillator 50 ceases producing clock pulses on line 60 when the CB output achieves a high logic level voltage. Additionally, the "Power OK" signal produced on line 38 by amplifier 34 is applied to a reset (RST) input of counter 52 for resetting the count of counter 52 to zero so long as the Power OK signal is high. Thus, the switch 54 couples load 16 to battery ground to enable operation of the load whenever Vbatt is above the specified switching voltage (13 volts, for example), but disconnects load 16 from battery ground to prevent further discharging of battery 10 by load 16 if Vbatt falls below the switching voltage long enough for the clock pulses of oscillator 60 to produce a high logic level voltage at the CB output of counter 52. When the CB output goes high, further operation of the oscillator is inhibited, latching switch 54 in its power interrupt state. When Vbatt subsequently rises above the specified switching voltage, the Power OK signal on line 38 holds the count of counter 52 (and the CB output on line 56) at zero, and the switch 54 returns to the depicted state to enable operation of the load 16. The clock frequency of oscillator 50 and the count capacity of counter 52 are designed so that the interval between a high-to-low transition of the Power OK signal and a low-to-high transition of the CB output of counter 52 is sufficient to prevent drop-out of the load 16 in response to battery voltage transients due to transient load conditions or even stalling and re-starting of the vehicle engine. As mentioned above, an exemplary interval for most applications is about 30 seconds.

Of course it will be recognized that some or most of circuit 20 may be implemented by a suitably programmed microprocessor, which would be particularly advantageous in applications where the circuit 20 is integrated into the load 16 or some other control module that already includes a microprocessor. In such case, the functionality of oscillator 50 and counter 52 could be replaced by a variable that is periodically incremented whenever the Power OK signal is low, with the variable being reset to zero if the Power OK signal goes high, and the switch 54 being activated to the depicted state when the variable reaches a specified count. Obviously, the microprocessor could perform the function of amplifier 34 and other circuit elements as well.

In summary, the power supply circuit of this invention effectively prevents discharging of a vehicle storage battery due to the use of electric accessory loads without causing nuisance interruptions, and automatically restores power to the loads as soon as possible without causing further discharging of the battery. While described in reference to the illustrated embodiment, it is expected that various modifications in addition to those mentioned above will occur to those skilled in the art. For example, simple RC timers or a microprocessor with built-in voltage comparators and A/D converters may be utilized. Thus, it will be understood that circuits incorporating these and other modifications may fall within the scope of this invention, which is defined by the appended claims.

What is claimed is:

1. A power supply circuit for an accessory load of a motor vehicle including a storage battery and an engine driven mechanism coupled to the storage battery for producing supplemental electrical energy during engine operation, the power supply circuit comprising:

a switch mechanism having a first state in which the accessory load is connected to the storage battery, and a second state in which the accessory load is disconnected from the storage battery;

comparator means for measuring a voltage established by said storage battery and comparing the measured voltage to a reference voltage that is equal to said measured voltage when a terminal voltage of said storage battery equals a switching voltage that is higher than open-circuit voltage of the battery but lower than a minimum voltage produced by the engine driven mechanism during engine operation to determine if the engine driven mechanism is producing supplemental electrical energy; and a timer circuit responsive to the comparison of the measured voltage to the reference voltage for establishing the state of said switch mechanism such that the first state of the switch mechanism is established whenever it is determined that the engine driven mechanism is producing supplemental electrical energy, and the second state of the switch mechanism is established when it is determined that the engine driven mechanism is not producing supplemental electrical energy for at least a predefined time interval.

2. The power supply circuit of claim 1, wherein the second state of the switch mechanism is established to disconnect the accessory load from the storage battery whenever an output of the timer circuit is active, and wherein the comparator means prevents said output from being active whenever the measured voltage exceeds the reference voltage.

3. The power supply circuit of claim 2, wherein the output of the timer circuit is produced by a counter that receives and counts clock pulses produced by a pulse generator, and such output becomes active when the pulse count reaches a reference count corresponding to said predefined time interval.

4. The power supply circuit of claim 3, wherein said comparator means continuously resets the pulse count of said counter whenever the measured voltage exceeds the reference voltage.

5. The power supply circuit of claim 1, wherein the vehicle includes an accessory load connector coupled to the storage battery, the power supply circuit is connected to the accessory load connector, and the accessory load is connected to the storage battery through the power supply circuit and the accessory load connector.

6. A method of supplying electrical power to an accessory load of a motor vehicle including a storage battery and an engine driven mechanism coupled to the storage battery for producing supplemental electrical energy during engine operation, the control method comprising the steps of:

measuring a voltage established by said storage battery;

establishing a reference voltage that is equal to said measured voltage when a terminal voltage of said storage battery equals a switching voltage that is higher than a nominal open-circuit terminal voltage of the battery but lower than a minimum voltage produced by the engine driven mechanism during engine operation;

determining that the engine driven mechanism is producing supplemental electrical energy when the measured voltage exceeds the reference voltage, and that the engine driven mechanism is not producing supplemental electrical energy when the measured voltage is below the reference voltage; and connecting the accessory load to the storage battery whenever it is determined that the engine driven mechanism is producing supplemental electrical energy, and disconnecting the accessory load from the storage battery when it is determined that the engine driven mechanism is not producing supplemental electrical energy for at least a predefined time interval.

* * * * *